May 20, 1941.　　H. V. MUTH ET AL　　2,242,918
DEHYDRATOR
Filed Sept. 30, 1937　　3 Sheets-Sheet 1
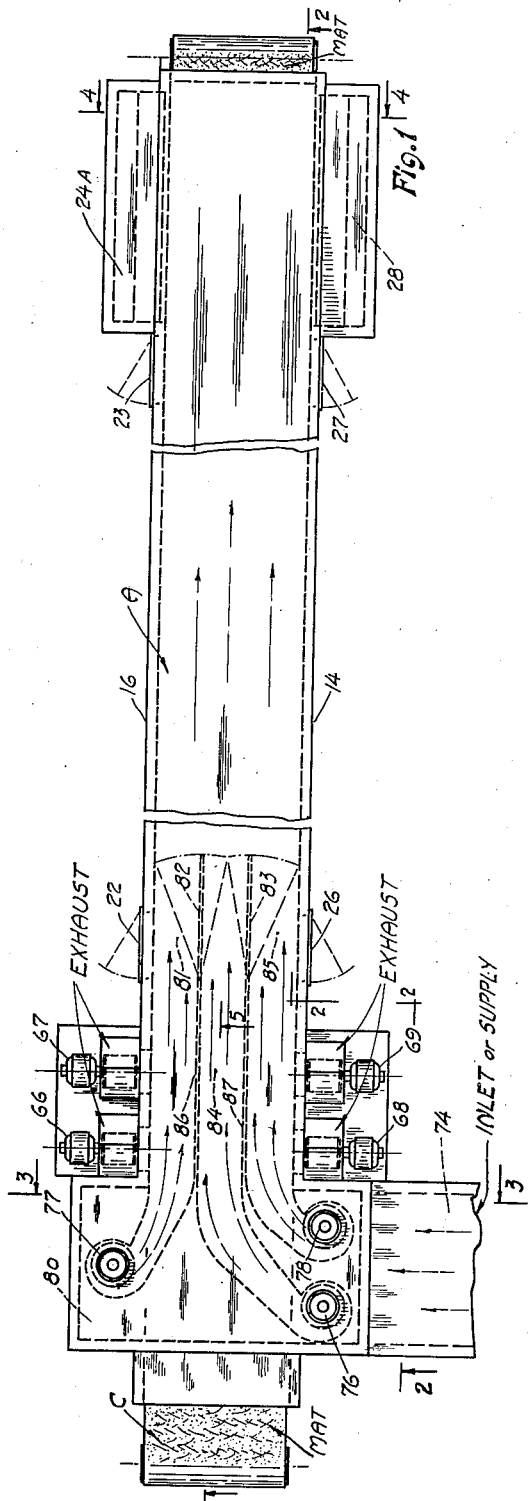
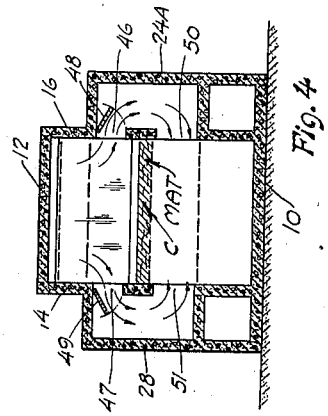
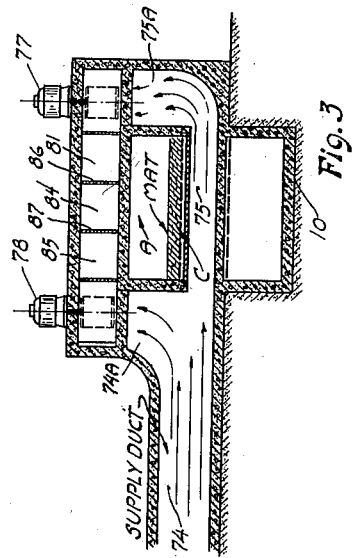
INVENTOR.
Harvey W. Muth
Louis M. Stamberg
BY
Harry Sangsam
ATTORNEY May 20, 1941.  H. V. MUTH ET AL  2,242,918
DEHYDRATOR
Filed Sept. 30, 1937   3 Sheets-Sheet 2
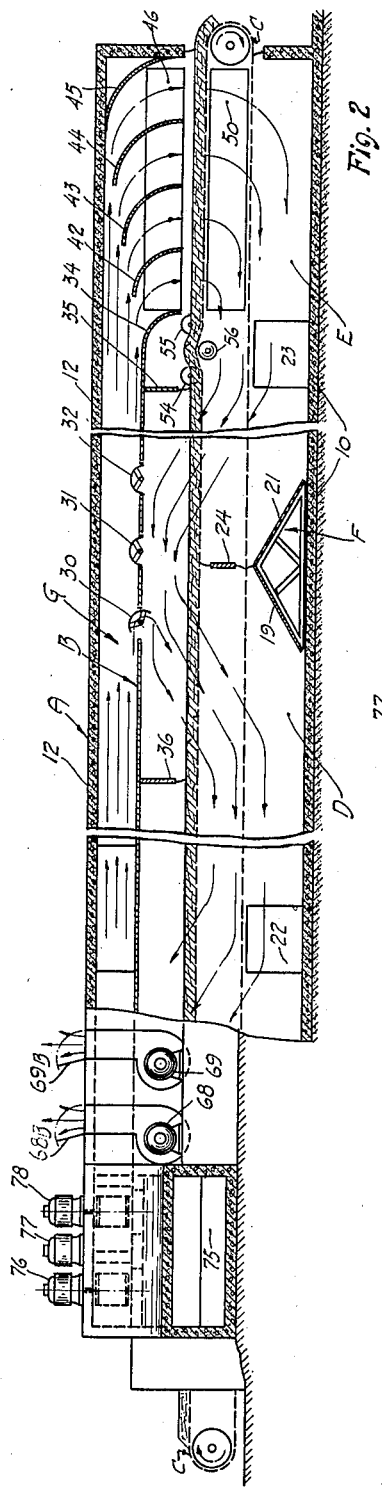
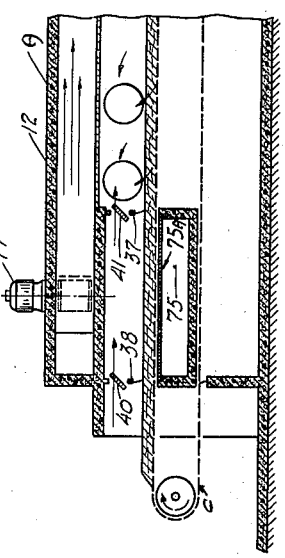
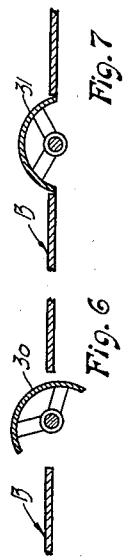
INVENTOR.
Harvey W. Muth.
Louis M. Stamberg
BY Harry Langsam
ATTORNEY.

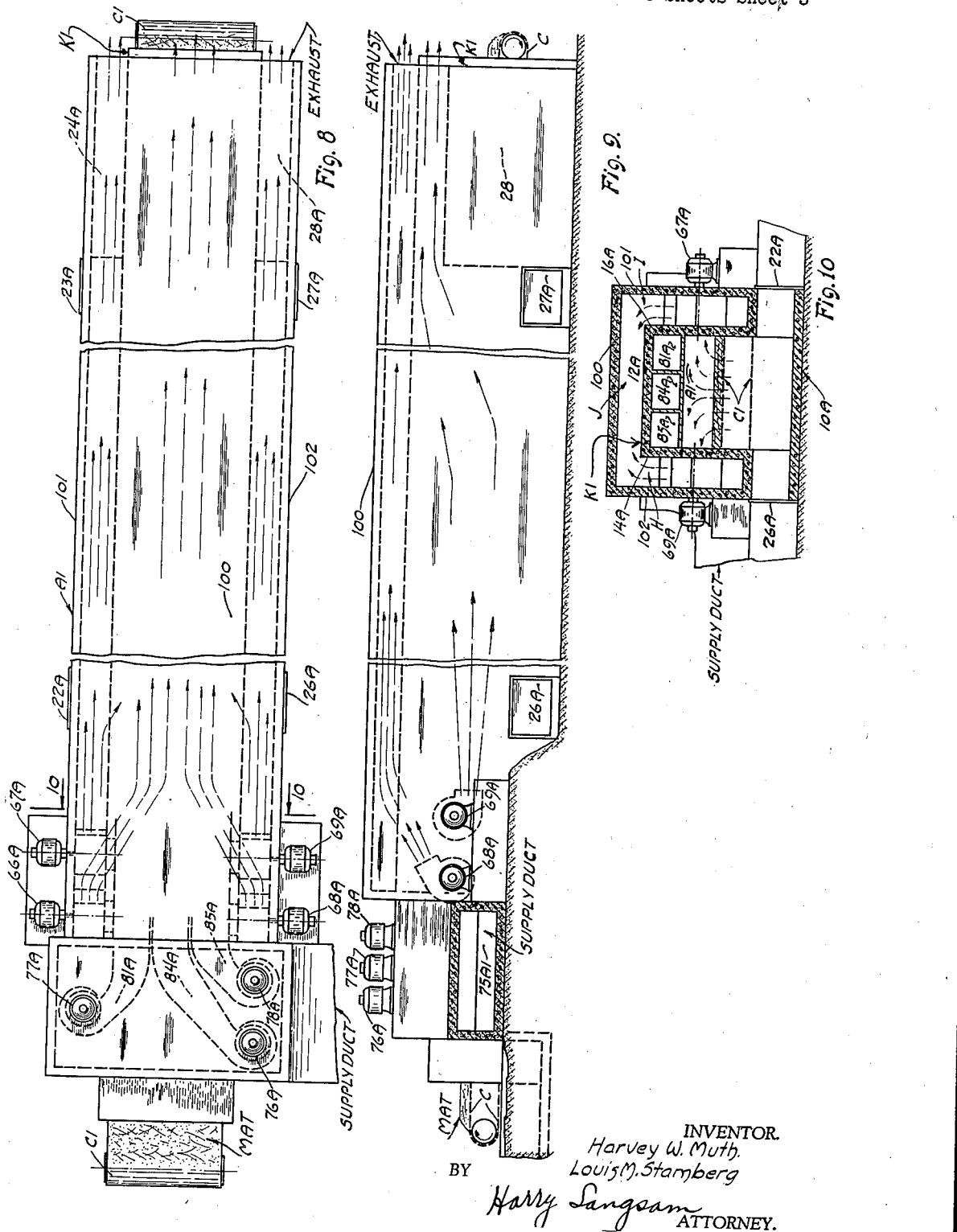

Patented May 20, 1941

2,242,918

UNITED STATES PATENT OFFICE 2,242,918

DEHYDRATOR

Harvey W. Muth and Louis M. Stamberg, Allentown, Pa., assignors of one-half to said Stamberg and one-half to William H. Gackenbach, Allentown, Pa.

Application September 30, 1937, Serial No. 166,506

4 Claims. (Cl. 34—68)

Our invention relates to a dryer and relates particularly to apparatus for removing water from and otherwise curing green forage crops without injury to its natural food elements or its natural color in order to prepare the same for use in animal feed.

Heretofore, dehydrators have been employed for drying or curing green forage crops which consists of running the crops through a cutter at the forward end of the dehydrator so that the crops form a mat, and the mat is carried upon an endless belt in a chamber where the moisture is removed from the crops by an absorbefacient fluid such as heated gases or hot air. The prior art devices have had endless conveyors mounted within the heating chamber but wherein the absorbefacient fluid has been forced upwardly through the mat, which results in lifting the mat from the conveyor if it is not of the proper density and thickness and wherein the heated air does not pass through the entire mat but only passes through a portion thereof before being dissipated.

It is an object of our invention to utilize a dehydrator of sufficient length so that the green cut forage material may be continuously placed on the conveyor without any interruption.

Another object of our invention is to provide a plurality of fans to force the heating medium through the heating chamber.

Another object of our invention is to provide a plurality of remotely controlled adjustable baffles in a dehydrating unit for the purpose of equalizing the pressure of air within the drying chamber which pressure depends upon the density of the mass of forage crops to be dried.

Another object of our invention is to dry and otherwise cure green forage crops by forcing low temperature air through the material at a high velocity.

Another object of our invention is to provide an adjustable by-pass at the forage crop discharge end of the chamber in order to draw off a portion of the air from the supply duct to heat the underside of the material forming the mat at the aforementioned discharge end, and to relieve the air pressure, when necessary, upon the mat at the discharge end to avoid excessive packing of the mat.

Another object of our invention is to use drying medium to pass downwardly through the mat near the end of the conveyor where the mat is driest and lightest in weight.

Another object of our invention is to preheat the moistened material before it passes into the heated gas chamber by passing the mat over a heat pan.

Another object of our invention is to break up the mat to allow for the free passage of the drying fluid by passing the mat over a combination of rollers.

Another object of our invention is to have the fans arranged so that the failure of one fan would not seriously hamper the operation of the dehydrator.

Another object of our invention is to have the fans so arranged that it is possible to stop the operation of one or more fans without affecting the operation of the other fans and without necessitating the shutting down of the entire dehydrator.

Another object of our invention is to provide a series of adjustable by-passes to enable a portion of the drying medium to pass directly from the drying medium supply ducts to the drying chamber at points where the material in the mat may require higher drying temperatures or velocities.

Another object of our invention is to provide vanes in the heated medium passageway to permit the closing of the duct from one or more of the fans.

Another object of our invention is to provide an absorbefacient fluid supply duct on top of the drying chamber which supply duct is of sufficient length to prevent the entry of live sparks upon the forage crop.

Another object of our invention is to provide a number of drying fluid exhaust fans so coordinated with air supply fans that uniform drying fluid pressure and uniform velocity can be maintained throughout the entire drying chamber.

Another object of our invention is to construct units to be placed on the floor of the drying chamber which units are movable and they assist in equalizing the air pressure in the drying chamber and facilitate the movement of the drying medium in a direction towards the mat.

A still further object of our invention is to introduce a portion of the heat energy, from the heated drying medium, into the drying chamber by radiation through a metal partition, the latter separating the heat supply duct from the drying chamber thereby increasing the quantity of heat in the drying chamber at points where most needed.

Another object of our invention is to provide in a dehydrator a variable control of the drying medium to take care of the different characteristics of the green forage crops.

Another object of our invention is to utilize the moisture laden warm gases to keep the main drying chamber warm whereby the thermal efficiency of the unit will be relatively high.

Other objects of our invention are to provide an improved device of the character described of simple and economical construction, that possesses a maximum amount of serviceability, and which is economical and efficient in operation.

With the above and related objects in view, our invention consists in the details of construction and combination of parts, as will be more fully understood from the following description, when read in conjunction with the accompanying drawings in which:

Fig. 1 is a plan view of a dryer embodying our invention.

Fig. 2 is an elevational view taken on the line 2—2 of Fig. 1.

Fig. 3 is a fragmentary plan view illustrating the supply gas passageway and the motors which operate the supply fans.

Fig. 4 is a sectional view taken on the line 4—4 of Fig. 1.

Fig. 5 is a sectional view taken on the line 5—5 of Fig. 1.

Fig. 6 is a fragmentary sectional view showing a valve and a heating medium by-pass vent in open position.

Fig. 7 is a view of the by-pass vent shown in Fig. 6 with the vent in closed position.

Fig. 8 is a plan view of a modification of our invention.

Fig. 9 is a side view of the modification of our invention illustrated in Fig. 8.

Fig. 10 is a sectional view taken on the line 10—10 of Fig. 8.

Referring in greater detail to the drawings, the dehydrator comprises a housing defining an elongated heating or drying chamber, generally designated as A. The heating or drying chamber A is preferably built of concrete having a bottom floor 10, a top or ceiling 12, and vertically extending side walls 14 and 16 joining the side edges of the bottom 10 and top 12.

A horizontally extending metal or other heat conducting material plate or wall, generally designated as B, located within the chamber A extends from the front of the chamber to a point adjacent the rear. The heated plate serves to radiate heat to the upper surface of the forage crop within the heating chamber.

A heat medium passageway or duct G is defined by the plate B, the top 12, and the portion of the side walls 14 and 16 which join the side edges of the plate B and the top 12.

The horizontal heating plate B lies above an endless conveyor belt, generally designated as C, on which a continuous mat of green forage crop is carried. The mat is formed at the forward end of the heating chamber by apparatus not forming part of this invention.

The elongated drying medium duct G prevents the ignition of the dry forage crop because the heated gaseous medium must travel a long distance before it passes downwardly into the mat and any live sparks mingling with the heated gases will be extinguished in its travel.

A plurality of pits D and E are defined by a triangular prism, generally designated as F. The number of prisms employed depends on the number of undulations or passes through the mat. These prisms are made of metal and are movable, their relative positions depending upon the condition of the mat and the amount of drying medium required to be passed through the mat at the various points in the heating chamber. The prism F has vertically positioned triangular shaped end walls and rectangular side walls 19, 21 joining the aligned sides of each end wall. Hence, the walls 19 and 21 are inclined with respect to the base of the prism F. The prism F in combination with baffle 24 comprises a barrier in compartment E, thereby deflecting the air upwardly through the mat. The inclined planes of the prism assist in deflecting and directing the air in the proper direction.

The space between the prism F defines the pits D and E wherein mat refuse and other deleterious matter may be collected and subsequently removed.

A plurality of clean-out doors 22 and 23 are located in the side wall 16, and a plurality of clean-out doors 26 and 27 are located in the side wall 14 of the dehydrator housing.

A vertically extending and adjustable baffle 24 is located directly above the apex of the rectangular prism F, and the baffle is positioned between the upper and lower sides of the endless belt conveyor C. This baffle is movable so that it can always be located directly over the apex of the prism. A flexible member is positioned on the upper edge of the prism F, and the upper as well as the lower horizontal edges of the baffle 24 and each of the flexible members rub against the conveyor and so prevent the passage of the drying gas.

The heating plate B has a plurality of by-pass valves 30, 31, and 32 cooperating with vents in the plate so that the heated gases or drying medium may be directed downwardly upon the mat prior to the time the main portion of the heated gases pass to the rear end of the drying chamber. These by-pass valves are manually controlled from a point outside the heating chamber and are of importance to enable the mat to be dried more rapidly at such time as when the moisture content of the mat is in excess of that normally found.

Suitably positioned from the underside of the hot plate B are a plurality of vertically positioned plates or baffles 34, 35, 36, 37 and 38 (Figs. 2 and 5). The bottom edge of each of the aforementioned baffles has a flexible member thereon which extends sufficiently low to contact the mat; this flexible member provides a seal against the heating medium passing therethrough. The baffle 36, and similar baffles where used, are adjustable along the longitudinal length of the chamber whereas the baffles 34, 35, 37 and 38 are fixed.

The vertically hanging plates 37 and 38 located at the forward end of the metallic plate B have check dampers 40 and 41 (Fig. 5) therein so that air from outside the dehydrator may be drawn into the drying chamber when the dampers 40 and 41 are in open position. This dry outside air removes vapor rising from the wet mat as the wet mat passes over the hot plate 75A.

A plurality of drying-medium curved deflecting plates 42, 43, 44 and 45 are located within the drying chamber and are disposed at such angle that the drying medium moving in a forward direction above the hot plate B after striking the deflecting plates is forced in a downwardly direction to hold the mat upon the endless conveyor. This arrangement of deflecting and drying medium downwardly through the mat serves to keep the mat in engagement with the endless belt or conveyor C.

Adjacent the angularly located deflecting plates 42, 43, 44 and 45 are aligned drying fluid by-pass side pockets 24A, 28. These by-pass pockets are arranged as follows: within the side pockets 24A, (Figs. 1 and 4) is an opening 46 communicating with the drying medium passageway. A pivotally mounted closure gate 48 suitably located within the opening 46 is connected to manually operated mechanisms (not shown); the control for the latter mentioned mechanisms is suitably positioned outside of the heating chamber housing and by the proper manipulation of the control the gate 48 within the opening 46 may be either closed or opened.

A second opening 50 is positioned in a plane which is lower than the plane of the forage crop mat and this opening is in communication with the opening 46 by means of the side pocket 24.

The opening 47 in the by-pass pocket 23 may be opened or closed by a pivoted gate 49 which is controlled by means of a manually controlled mechanism the control mechanism (not shown) being located outside of the housing.

Thus, it should be observed that under certain conditions the drying gas may be by-passed to a greater or less extent around the sides of the mat instead of directly through the mat, and the quantity of drying gas by-passed may be controlled from a point outside of the heating chamber housing. It also should be observed that the drying gas thus by-passed heats or dries the underside of the material forming the mat before it leaves the drying chamber and also permits a reduction of fluid pressure upon the mat where it is lightest, in order to prevent excessive or undue packing of the material in the mat.

In order to break the mat of forage crops so that the absorbefacient fluid will readily pass therethrough, we place a plurality of rollers 54, 55 and 56 (Fig. 2) so that the endless conveyor C is abruptly raised and then lowered so that the mat is bent to break or loosen its continuity. This breaking or bending of the mat occurs prior to the time the mat meets the main downflow of the drying gases adjacent the drying medium deflectors 42 to 45. Rollers 54, 55 are placed above the side edges of the perforated screen which forms the conveyor C and a roller 56 is placed beneath the conveyor but between the vertical planes passing through the rollers 54 and 55. Two sets of rollers are necessary—one set being placed on each side wall of the housing. An air pocket above the rollers is defined by a portion of the plate B, the baffles 34 and 35 and a portion of the sides of the drying chamber. There is no movement of the drying medium through the air pocket, hence, no holes will be blown through the mat.

After the drying medium is forced through the mat or is by-passed around the mat, it continues to reverse its direction of travel so that it heats the underside of the mat until its passage is obstructed by the prism F on the floor of the heating chamber and baffle 24 and then the drying medium rises upwardly between the baffle or deflector plates 35 and 24.

After the heating medium ascends above the mat, it is again deflected downwardly in order to pass under the adjustably mounted vertically extending deflector or baffle plate 36, which protrudes from the under surface of the horizontal plate B. After the drying medium reaches the forward end of the chamber, the drying medium now being well saturated with moisture, it is drawn by electric motor driven exhaust fans 66, 67, 68 and 69 and is ejected from the exhaust of the fans into the atmosphere. The exhaust ducts of the fans are fitted with closure members 68B, 69B. The closure members are placed in a closed position should it be desirable to stop the associated fan.

The advantage of utilizing a plurality of separately-actuated exhaust-fans is that one or more fans may be operated when the forage crops are dry or the humidity is low; or upon repairs being made to a motor, the entire dehydrator need not be shut down.

*The drying medium supply*

The drying medium comprises heated air or gases which have been passed over or obtained from suitable coal furnaces. The coal furnaces (not shown) are located apart from the drying chamber housing illustrated in Fig. 1 and the heated absorbefacient fluid passes from the furnaces into the inlet or supply duct 74 where the duct 74 divides into a branch duct 74A and a second branch duct 75, the latter passing directly under the forward end of the conveyor where the forage crops are first received by the conveyor. This arrangement of having a portion of the supply gases pass under the moist forage crops tends to expedite the drying action. The two supply units 76 and 78 draw the drying fluid from duct 74A and force it into the duct G.

The duct 75 continues to the opposite side of the housing where it is designated as the duct 75A,—the drying medium within the duct 75A is forced into the supply duct G by the induction supply fan 77.

The top of duct 75 within the heating chamber comprises a metal plate which is heated by the heated drying medium passing under it, hence, the plate radiates heat upwardly to the damp mat thereby preheating the mat shortly after it enters the drying chamber.

The drying fluid is forced by the supply units 76, 77 and 78 into the supply duct G, and the drying fluid flows in a longitudinal direction from the front to the rear of the housing.

The front end of the duct G immediately leading from the supply fans is sub-divided into three passageways 81, 84 and 85 by the two partitions 86 and 87 equally spaced from the nearest side wall.

Pivotally mounted closure gates 82 and 83 (Fig. 1) attached to the ends of partitions 86 and 87, respectively, may be oscillated to close the passageways within the duct G. The gate 82 adapted to be controlled externally of the housing may be operated to close the passageway 81, and it also may be moved to partially close the central passageway 84. The gate 83 may be moved, by mechanisms externally controlled, to close the passageway 85, and the gate may be moved to partially close the central passageway 84. Hence, in order to close the central passageway, both gates 82 and 83 must be moved to partially close the central passageway whereas each of the end passageways 81 and 85 may be closed by the gates 82 and 83, respectively.

The removal of the proper amount of moisture from the green forage crop without removing any other nourishing or nutritious matter necessary to remain in the feed or finished product is achieved in any one or a combination of the following methods, namely:

(1) By regulating the speed of the endless conveyor which carries the mat through the drying chamber.

(2) By the quantity and velocity of the heated gaseous medium as it passes through the chamber—particularly as controlled by the number of supply and exhaust fans in operation.

(3) By the quantity of heated drying fluid which passes through the material in the mat as controlled by the use of the various baffles and by-passes.

*Modification Figs. 8, 9 and 10*

We disclose a modification of our invention in Figs. 8, 9, and 10 wherein a forage crop dehydrator has an endless conveyor, generally designated as $C^1$, extend longitudinally within an elongated heating chamber, generally designated as $A^1$. The heating chamber is defined by a concrete housing, generally designated as $K^1$, which is constructed similarly to the housing for the heating chamber A illustrated in Figs. 1 and 2; however, the housing $A^1$ differs principally from the aforementioned housing A in that it has a second ceiling 100 and side walls 101, 102 defining exhaust-fluid passageways H, I and J.

The exhaust fluid passageways surround the top and sides of the main housing $K^1$ thereby increasing the entire unit. The modification now being described effects an increase in the thermal efficiency of the unit by utilizing the absorbefacient or drying medium, which is at a temperature higher than that of the surrounding atmosphere, instead of directly discharging it into the atmosphere. Hence, the drying medium laden with moisture serves as a jacket to surround and keep the main chamber warm. This exhaust gas sheath or jacket prevents the loss of heat energy from the original drying gases.

It should be observed that the moisture laden drying gases are withdrawn from the heating chamber $A^1$ by means of a plurality of exhaust fans 66A, 67A, 68A and 69A through suitable openings in the side walls, the last-mentioned walls partially define the main walls of the heating chamber $A^1$, and the openings communicate with the side exhaust gas passageways.

The rear ends of the exhaust gas passageways are open to the atmosphere so that the exhaust gases laden with moisture travels substantially the length of the dehydrator and so keep the dehydrator substantially warm.

The modification of our invention disclosed in Figs. 8 to 10 have clean-out doors 22A, 23A, 26A and 27A similarly located as the doors 22, 23, 26 and 27 in the dehydrator shown in Fig. 1; hence, no detailed description will now be entered into as the same description applies to both units.

The drying medium supply ducts 81A, 84A, 85A which have the supply units 76A, 77A and 78A force the drying medium under pressure through the drying chamber and are located and function similarly to the ducts 81, 84, 85 and the supply units 76, 77 and 78 in the dehydrator, shown in Fig. 1. The supply duct 75A1 is similar in construction to the supply duct 75A of Fig. 3. In view of the similarity of the aforementioned elements in both modifications of our invention, we will omit a detailed description of sub-elements at this time as the elements have already been described in detail.

The drying gases first pass downwardly or around the mat at the rear end of the heating chamber and the gases travel in a direction towards the front in an undulating manner, that is, the heating medium passes upwardly through the mat then downwardly through the mat and the cycle is repeated as the gases move forwardly until the exhaust fans draw the moisture laden gases into the discharge passageways.

Although our invention has been described in considerable detail, such description is intended as illustrative rather than limiting, since the invention may be variously embodied, and the scope of the invention is to be determined as claimed.

We claim as our invention:

1. In a dehydrator, a heating medium passageway in said dehydrator, an endless perforated conveyor beneath said passageway, means for forcing a heating medium through said passageway and downwardly through said conveyor so that a mat of forage crop carried by said conveyor will be maintained thereon, a heating medium by-pass located near one end of said conveyor and communicating with said passageway whereby a portion of said heating medium may be by-passed around said conveyor, and means for conducting said heating medium and said by-passed heating medium to the atmosphere.

2. In combination a drying chamber, a drying medium passageway located within said chamber, an endless perforated conveyor having overlapping portions within said drying chamber, a drying-medium-transversely-positioned-passageway lying at one end of said chamber and positioned between the overlapping portions of said conveyor and connected to said drying medium passageway, means to circulate a drying medium through said passageways and downwardly through said conveyor, means communicating with said first mentioned passageway and the lower portion of said chamber for by-passing a portion of the drying medium around said conveyor, means for deflecting the heating medium upwardly through said conveyor, a plurality of vertically arranged baffles located above said conveyor for deflecting the air downwardly through said conveyor, and means for exhausting the drying medium to the atmosphere.

3. A green forage crop dehydrator comprising a curing chamber, a perforated conveyor passing through said chamber and adapted to carry a crop mat therethrough, means for forcing a drying medium into said chamber, a passageway to guide said drying medium, means for guiding the drying medium first downwardly through the crop mat near the outlet end of the chamber, means adjustable to by-pass the drying medium downwardly upon said mat at different points of said mat, means to deflect said drying medium upwardly and downwardly through said mat, and means to bend said mat intermediate the ends of the mat.

4. In a forage crop dehydrator, a heating medium passageway, a housing defining a drying chamber, said passageway connected to said drying chamber, an endless perforated conveyor within said chamber, means forcing a heating medium into said passageway, means located in said passageway whereby the drying medium will be directed through said conveyor in a downwardly direction, a plurality of prisms lying on the bottom of said chamber beneath said conveyor for deflecting the heating medium upwardly through said conveyor, said prisms being movable within said chamber.

HARVEY W. MUTH.
LOUIS M. STAMBERG.